United States Patent [19]

Henriksson et al.

[11] Patent Number: 5,612,983
[45] Date of Patent: Mar. 18, 1997

[54] DEVICE FOR FILTERING WATER TO AN EMERGENCY COOLING SYSTEM IN A NUCLEAR POWER PLANT

[75] Inventors: Mats Henriksson, Älvkarleby; Johan Sjöstrand, Kungsbacka, both of Sweden

[73] Assignee: Vattenfall Utveckling AB, Alvkarleby, Sweden

[21] Appl. No.: 454,255
[22] PCT Filed: Dec. 3, 1993
[86] PCT No.: PCT/SE93/01041
 § 371 Date: Jun. 5, 1995
 § 102(e) Date: Jun. 5, 1995
[87] PCT Pub. No.: WO94/14166
 PCT Pub. Date: Jun. 23, 1994

[30] Foreign Application Priority Data

Dec. 4, 1992 [SE] Sweden .................. 9203676

[51] Int. Cl.$^6$ .................................. G21C 15/18
[52] U.S. Cl. ................ 376/313; 376/282; 210/411
[58] Field of Search .................... 376/282, 283, 376/299, 313; 210/162, 167, 333.01, 411, 416.2, 437, 443, 459, 497.01; 166/227, 230, 235

[56] References Cited

U.S. PATENT DOCUMENTS

| 4,376,091 | 3/1983 | Netkowicz et al. ............ | 376/313 |
| 5,120,494 | 6/1992 | Nazareno et al. ............ | 376/282 |

OTHER PUBLICATIONS

Sulzer Thermtec, "Nuclear Service and Valves", no date.

Primary Examiner—Daniel D. Wasil

[57] ABSTRACT

A device for filtering water to at least one emergency cooling system in a nuclear power plant of the type comprising a reactor arranged in a containment which substantially consists of an upright, suitably cylindrical container whose bottom part forms a pool for collecting water formed by condensation of steam present in the containment, the condensation pool including a number of back-flushable containers filter water which is taken from the pool and, if required, is supplied to nozzles in the emergency cooling system in order to cool the reactor core in the event of an inadmissible temperature rise therein, each strainer having a shape of a housing with at least one, suitably cylindrical, apertured strainer wall through which the water can flow from the outside and into the housing, and being connected, by a first conduit passing through the container wall, to a suction pump disposed outside the container wall, as well as connected to a secondary conduit for supplying wash water to the interior of the housing in order, if required, to flush the strainer wall by flowing the wash water through it from the inside and out, thereby removing filtrate deposited on the outside of the strainer wall, characterized in that a number of secondary strainers each consisting of an elongate, apertured tube having a diameter or maximum cross-sectional dimension from about 200 mm to about 400 mm and a length dimension at least five times greater than the diameter dimension, are connected either directly or indirectly by a third conduit to the first conduit connected to the suction pump.

14 Claims, 9 Drawing Sheets

DEVICE FOR FILTERING WATER TO AN EMERGENCY COOLING SYSTEM IN A NUCLEAR POWER PLANT

FIELD OF THE INVENTION

This invention relates to a device for filtering water to at least one emergency cooling system in a nuclear power plant of the type comprising a reactor arranged in a containment which substantially consists of an upright, suitably cylindrical container whose bottom part forms a pool for collecting water formed by condensation of steam present in the containment, the condensation pool including a number of back-flushable strainers serving to filter water which is taken from the pool and, if required, is supplied to nozzles in the emergency cooling system in order to cool the reactor core in the event of an inadmissible temperature rise therein, each strainer having the shape of a housing with at least one, suitably cylindrical, apertured strainer wall through which the water can flow from the outside and into the housing, and being connected, by a first conduit passing through the container wall, to a suction pump disposed outside the container wall, as well as connected to a second conduit for supplying wash water to the interior of the housing in order, if required, to flush the strainer wall by flowing the wash water through it from the inside and out, thereby removing filtrate deposited on the outside of the strainer wall.

BACKGROUND OF THE INVENTION

In actual practice, the above-mentioned emergency cooling system consists of a first sprinkler system comprising a plurality of nozzles or sprinklers mounted in the upper part of the reactor and adapted to spray large amounts of water on the fuel rods in order to cool these when there is an emergency. The plant further includes a second sprinkler system comprising a plurality of nozzles or sprinklers which, like those of the first system, take their water from the condensation pool in the containment, but which are mounted outside the reactor proper and are adapted to sprinkle the gas phase in the containment in order to reduce any remaining excess pressure therein as well as to cool conduits or other components found inside the containment but outside the reactor itself. In both instances, it is of great importance that the water supplied to the nozzles is free from all sorts of impurities, such as fibres, grains and particles, that might clog the nozzles. Naturally, this is especially important in the emergency cooling system, which has to be absolutely reliable. Many of the components mounted inside the containment, such as the conduits, are wholly or partly heat insulated. In most of today's nuclear power plants, this insulation is made up of fibres of mineral wool, which constitute an element of risk with regard to the two sprinkler systems, in that unintentionally released fibres may clog the nozzles if reaching the sprinkler systems. For this reason, nuclear power plants have been equipped with strainers of the type stated by way of introduction.

Existing back-flushable strainers are mounted on the inside of the cylindrical container wall of the containment. This wall is made up of a thick, resistant concrete wall and a lining in the form of non-corrosive sheet-metal applied on the inside of the wall, ensuring absolute liquid proofness between the inside and the outside of the containment. The strainers are mounted by means of a number of attachments anchored in the concrete by bolts or dowels carefully sealed where they pass through the sheet-metal lining.

In actual practice, it takes about 5–10 min to back-flush a strainer which is contaminated with a fibre mat tending to clog the strainer holes. It was previously held that the strainers could operate for at least 10 h without any need of back-flushing. However, real-life incidents have shown that this estimated minimum operating time is too long. In functional tests, it has happened that discharged steam has entrained mineral-wool insulation, which has dropped into the condensation pool and clogged the strainers even after about 30 min. Back-flushing, which takes 5–10 min, is not a critical operation 10 h after a possible reactor trip, since the decay power of the reactor core then has been considerably reduced, as has the need for cooling. However, if back-flushing is required after less than 1 h, the need for cooling of the core is still considerable, and an interruption of the water supply to the emergency cooling system therefore is unacceptable for reasons of safety.

An obvious solution would of course be to increase the area of the strainers. In theory, this could be done by replacing the existing back-flushable strainers with larger ones, i.e. having enlarged apertured strainer walls. However, such replacement strainers of enlarged diameter would be disadvantageous not only by being difficult to introduce into the containment through extremely narrow passages, but also by running the risk of being exposed to excessive mechanical forces when the water in the condensation pool is heaving when steam is blown into the containment.

SUMMARY OF THE INVENTION

This invention aims at providing a solution to this problem which can be implemented in expedient and reliable fashion. Thus, a basic object of the invention is to enable the installation, in existing plants, of additional strainers that can be introduced into the containment through narrow passages without difficulty. Another object of the invention is to enable expedient mounting of the additional strainers, so that these can be mounted in an existing plant in extremely short time, thus minimising the stoppage required. A further object of the invention is to provide an improved back-flushable strainer.

At least the basic object of the invention is achieved by a device having the features recited in the characterising clause of appended claim 1.

DESCRIPTION OF THE PREFERRED EMBODIMENT

Figure 1:
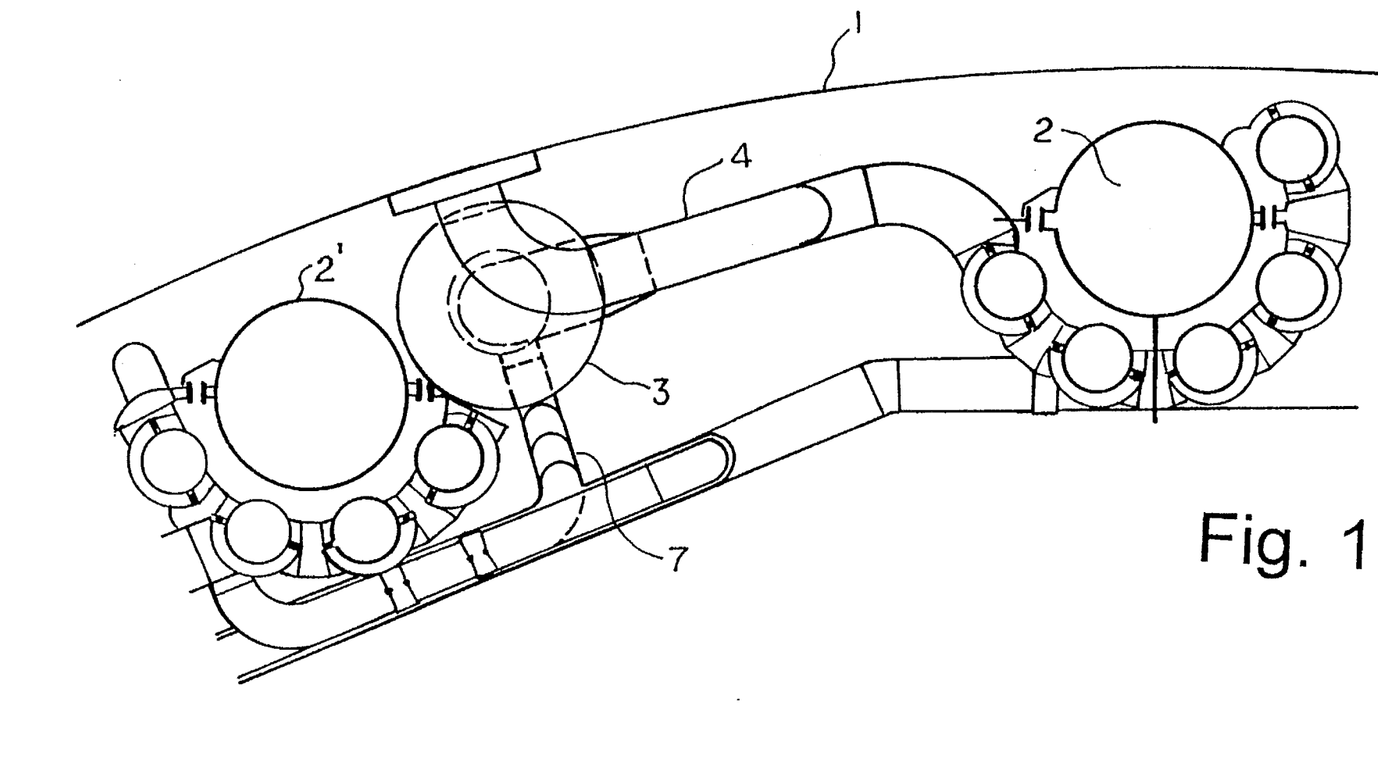
FIG. 1 is a schematic plan view showing part of the containment as well as a number of strainers adjacent to the cylindrical containment wall.

In FIG. 1, the reference sign 1 generally designates the cylindrical wall forming the containment of a reactor (not shown) in a nuclear power plant. However, the wall 1 is in FIG. 1 indicated in the form of a simple arcuate line. In actual practice, the wall is composed of a very thick reinforced concrete wall and a leak-proof lining of non-corrosive sheet-metal applied on the inside of the wall. A number of columns 2, 2', which form part of the loadbearing structure of the containment, are arranged inwardly of the cylindrical wall at a distance therefrom. In practice, such columns, which may be made of concrete, are evenly distributed along the periphery of the cylindrical wall, e.g. at a pitch of 12.5°. The columns may have a diameter of 0.8–1.0 m. Adjacent to the cylindrical wall, there is arranged a back-flushable strainer 3, which might be of conventional design. In a particular aspect of the invention, it is, however, preferred that a strainer of the type shown in detail in FIGS. 3–7 be used. The strainer 3 is connected to a first conduit 4 running through the wall 1 and, on the outside thereof, connected to a suction pump (not shown). The strainer is kept in place by means of brackets 5 (see FIG. 2) which are connected to attachments 6 anchored in the wall 1. A washwater conduit 7 is connected to the strainer and serves to supply either clean water from outside or filtered water to the interior of the strainer in order to flush the strainer wall. It should be pointed out that the strainers in the power plant are arranged in the vicinity of the bottom 8 of the containment 1 at a considerable distance below the normal water level 9 in the condensation pool formed by the bottom part of the containment.

Reference is now made to FIGS. 3–7, which illustrate the construction of the preferred back-flushable strainer in more detail.

Figure 2:
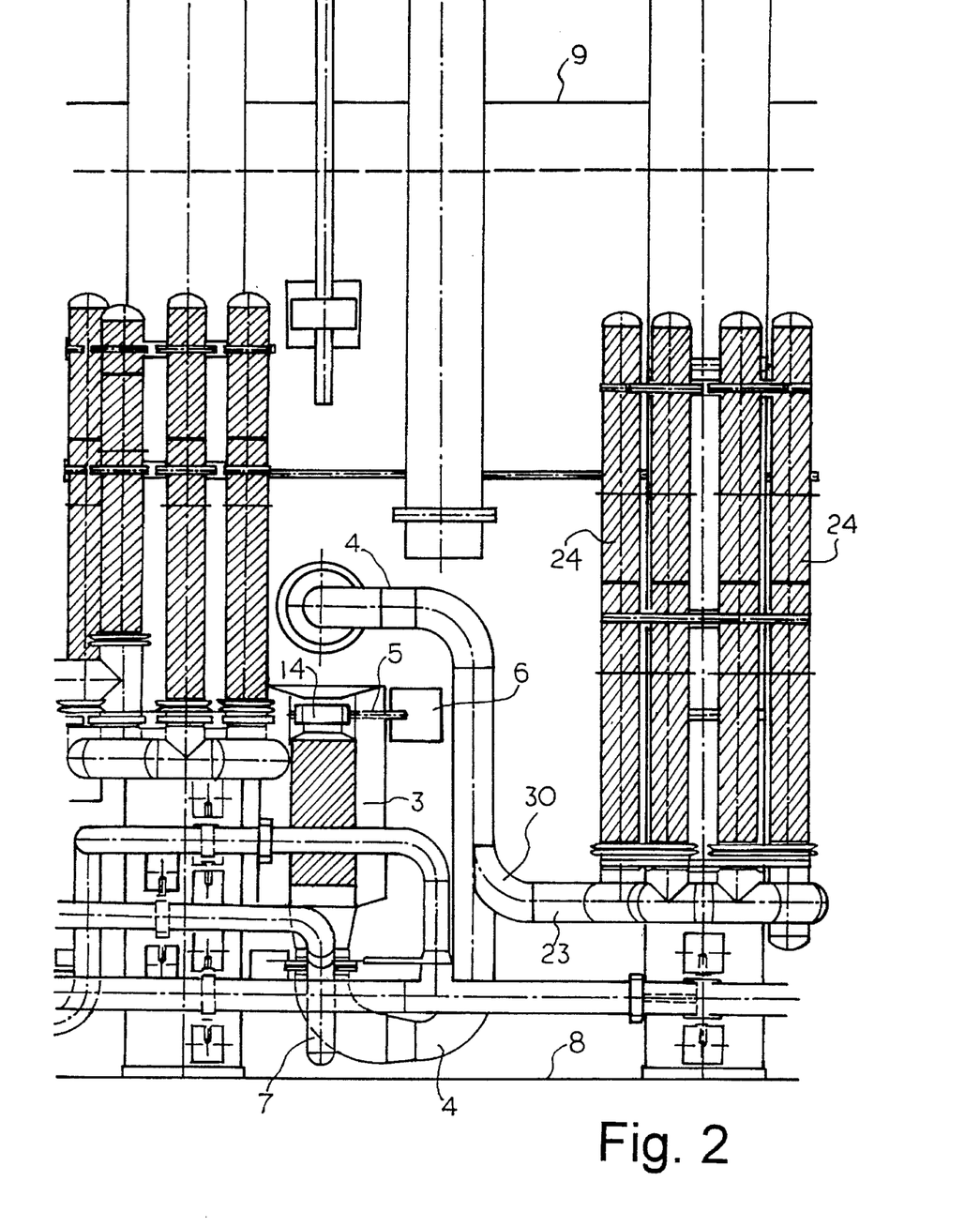
FIG. 2 is an elevational view showing the strainers in FIG. 1.
Figure 3:
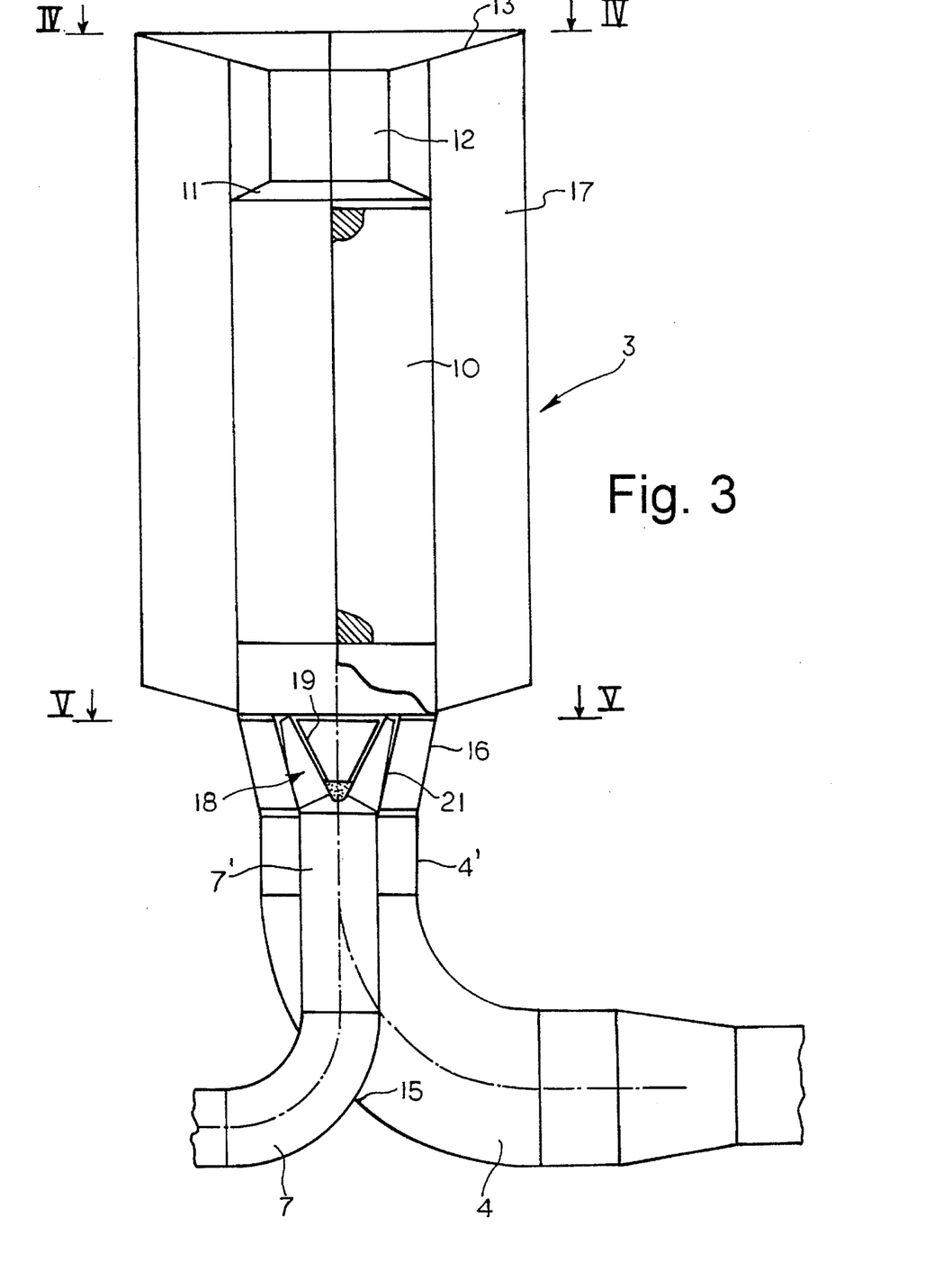
FIG. 3 is an enlarged vertical section of a back-flushable strainer according to a particular aspect of the invention.
Figure 4:
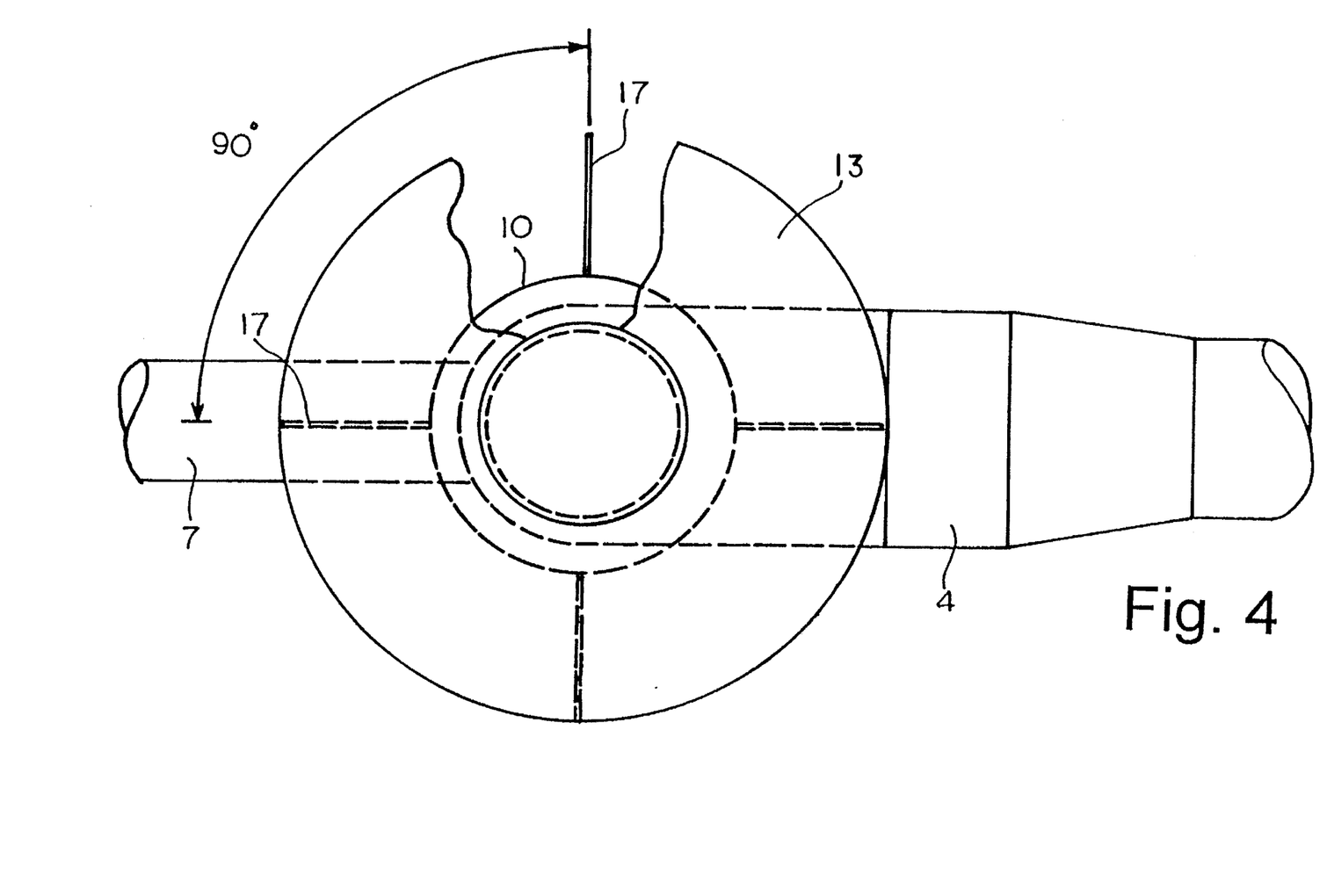
FIG. 4 is a horizontal section taken along IV—IV in FIG. 3.

As is seen most clearly in FIGS. 3 and 4, the strainer 3 substantially consists of a cylindrical strainer wall 10 in the form of a perforated metal sheet. In practice, the cylindrical strainer wall or tube 10 may have a length in the range of 0.7–1.5 m, suitably a length of about 1.0 m, and a diameter in the range of 0.4–0.6 m, suitably a diameter of about 0.5 m. The perforations may have a diameter in the range of 2–4 mm, the strainer wall having a total perforation area in the range of 25%–40%, suitably 30%–35%. Such dimensions enable a flow in the range of 100–250 kg/s through the strainer wall. In the embodiment illustrated, the strainer wall is vertically oriented and closed at the upper end. To be more specific, the strainer wall 10 merges, via a frustoconical portion 11, into a comparatively narrow throat 12 which ends with a frustoconical metal sheet 13 whose diameter much exceeds that of the strainer wall or tube 10. A clamp 14 (see FIG. 2), kept in place by the brackets 5, can be connected to the throat 12. The lower end of the strainer wall or tube 10 is open and connected to the first conduit 4 connected to the suction pump. The conduit 7 for supplying wash water to the interior of the strainer has a smaller diameter than the conduit 4, in which it is inserted through a hole 15 in a curved portion thereof, the portion 7' of the conduit 7 located inside the conduit 4 and the straight portion 4' of the conduit 4 connecting to the strainer being concentric. The diameter of the portion 4' is somewhat smaller than that of the strainer wall or tube 10, a conically tapering collar 16 being arranged at the transition therebetween.

According to a characteristic feature of the strainer illustrated in FIGS. 3 and 4, the strainer wall or tube 10 is on the outside provided with a number of longitudinal, peripherally spaced-apart and radially projecting wings or wing-like elements 17. In the embodiment illustrated, the strainer has four wings 17 arranged at a pitch of 900 and extending along the entire length of the strainer wall or tube 10 and all the way up to the frustoconical metal sheet 13, which serves as an attachment for the wings. Advantageously, the width of the wings is in the range of 25%–75% of the diameter of the strainer wall or tube 10, conveniently about 50% thereof. In conventional strainers without wings, the fibres deposite in the form of a continuous circumferential mat, in which the fibres are fairly closely intertwined. Such a continuous fibre mat offers a considerable resistance to removal from the strainer wall by back-flushing. The inventive strainer being provided with the wings 17, the fibre mat is divided into a number of separate sections (here four) which, individually, are much more easily released from the strainer wall.

Compared with conventional strainers, the inventive strainer has the considerable advantage of a rotation-generating means, generally designated 18, being arranged adjacent to the opening of the wash-water conduit 7 close to the strainer. As appears from FIG. 3 combined with FIGS. 5–7, the rotation-generating means consists of a conical body 19 centrally arranged in the conduit 7, and a plurality of curved blades 20 arranged on the outside of the body 19. The conduit 7, or more precisely the straight portion 7' thereof, ends with a conically tapering collar or tubular element 21, like the portion 4' of the conduit 4. The blades 20 extend between the inside of the collar 21 and the outside of the centrally-arranged body 19. The conicity of the centrally-arranged body 19 is so adjusted to the conicity of the collar 21 that the flow-through area of any optional horizontal cross-section taken along the vertical central axis is approximately of the same size. As appears from FIG. 5, the upper portions of the blades 20 adjacent to the annular opening passage are inclined in relation to the radial direction, and the blades have a curved shape, as appears from FIG. 6. Jointly, these features result in that the water supplied to the strainer by the rotation-generating means 18 is caused to rotate or circle such that, under the action of the centripetal force, it will be pressed outwards against the strainer wall 10 rather than move in an axial, vertical flow. In this manner, the wash water will be pressed out through the holes in the strainer wall with much greater force than in conventional strainers.

Figure 5:
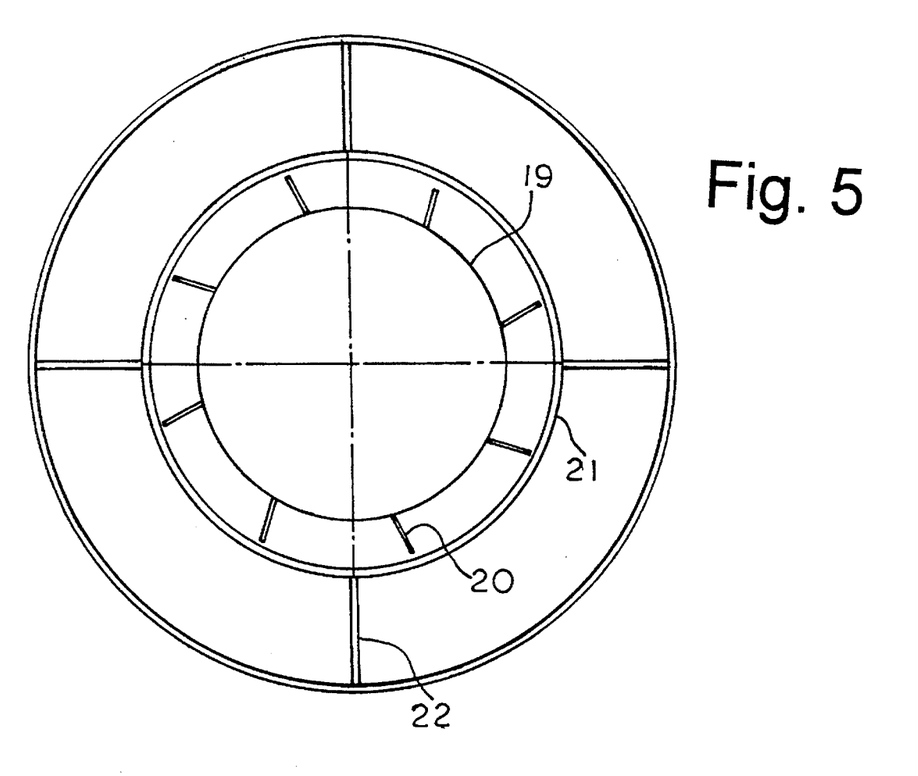
FIG. 5 is a similar enlarged section taken along V—V in FIG. 3.
Figure 6:
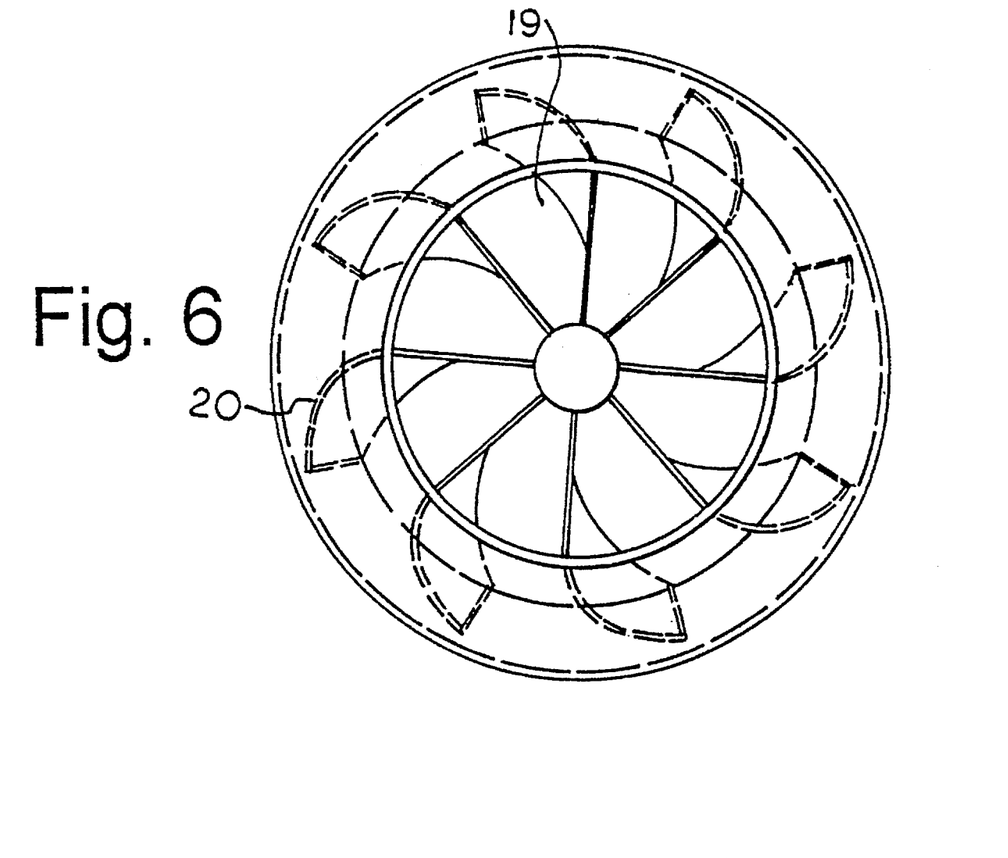
FIG. 6 is an enlarged horizontal section showing a rotation-generating means connected to the strainer.
Figure 7:
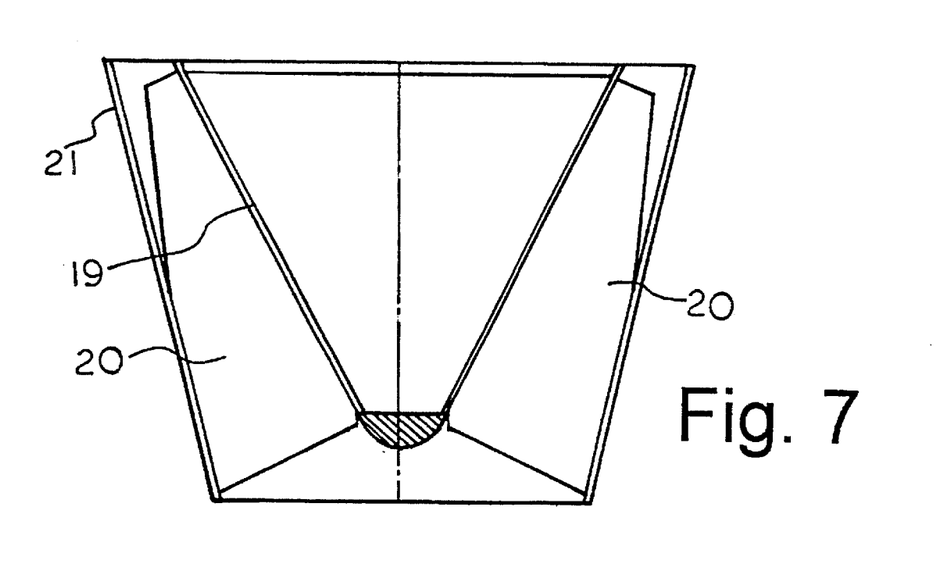
FIG. 7 is a vertical section of the rotation-generating means.

Furthermore, it may be mentioned that the collar 21 is maintained in concentric position with respect to the collar 16 by means of a suitable number of radially projecting flanges 22, as shown in FIG. 5.

Figure 8:
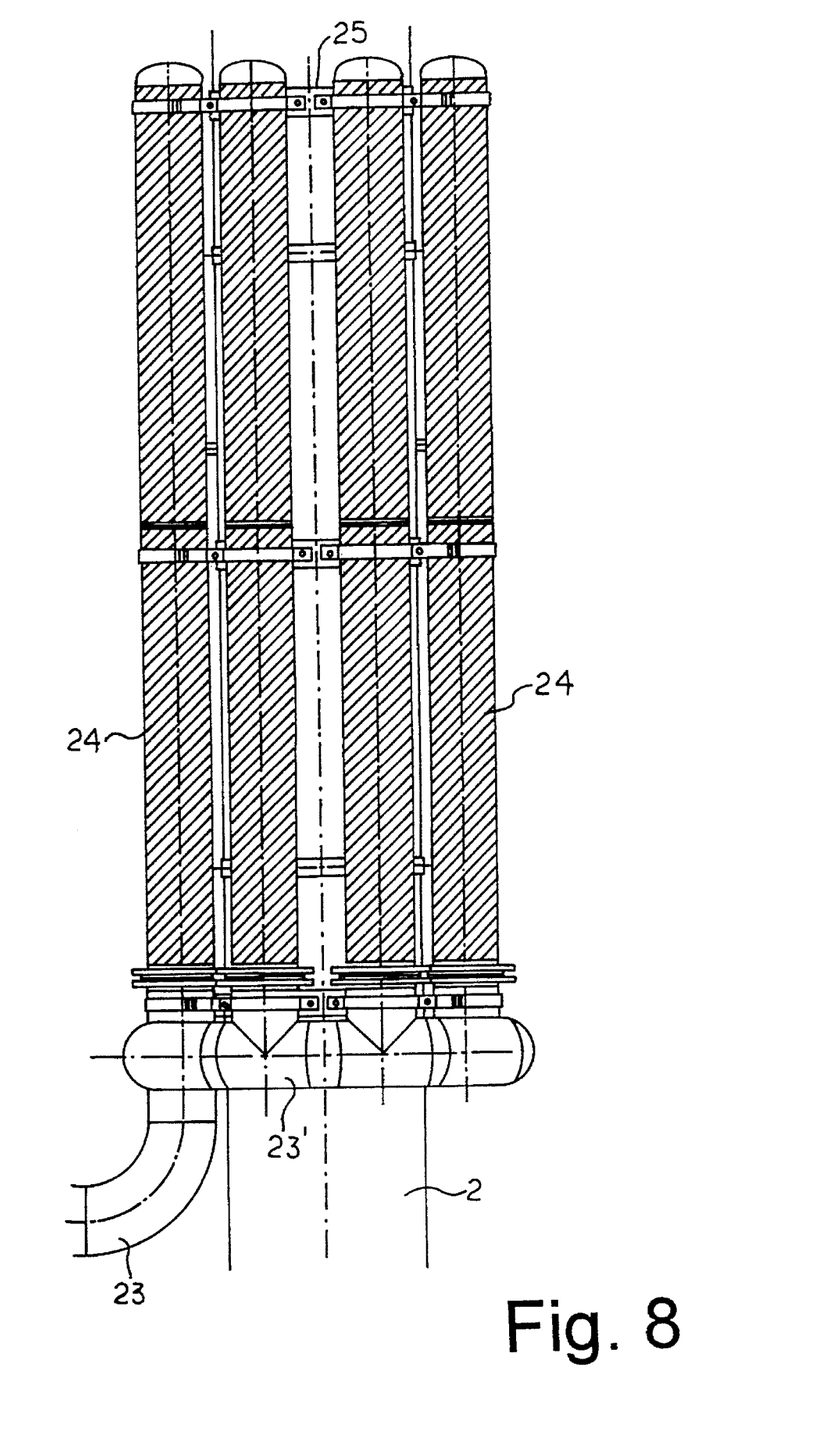
FIG. 8 is an enlarged elevational view illustrating in more detail a number of subsequently mounted strainers in according to the invention.
Figure 9:
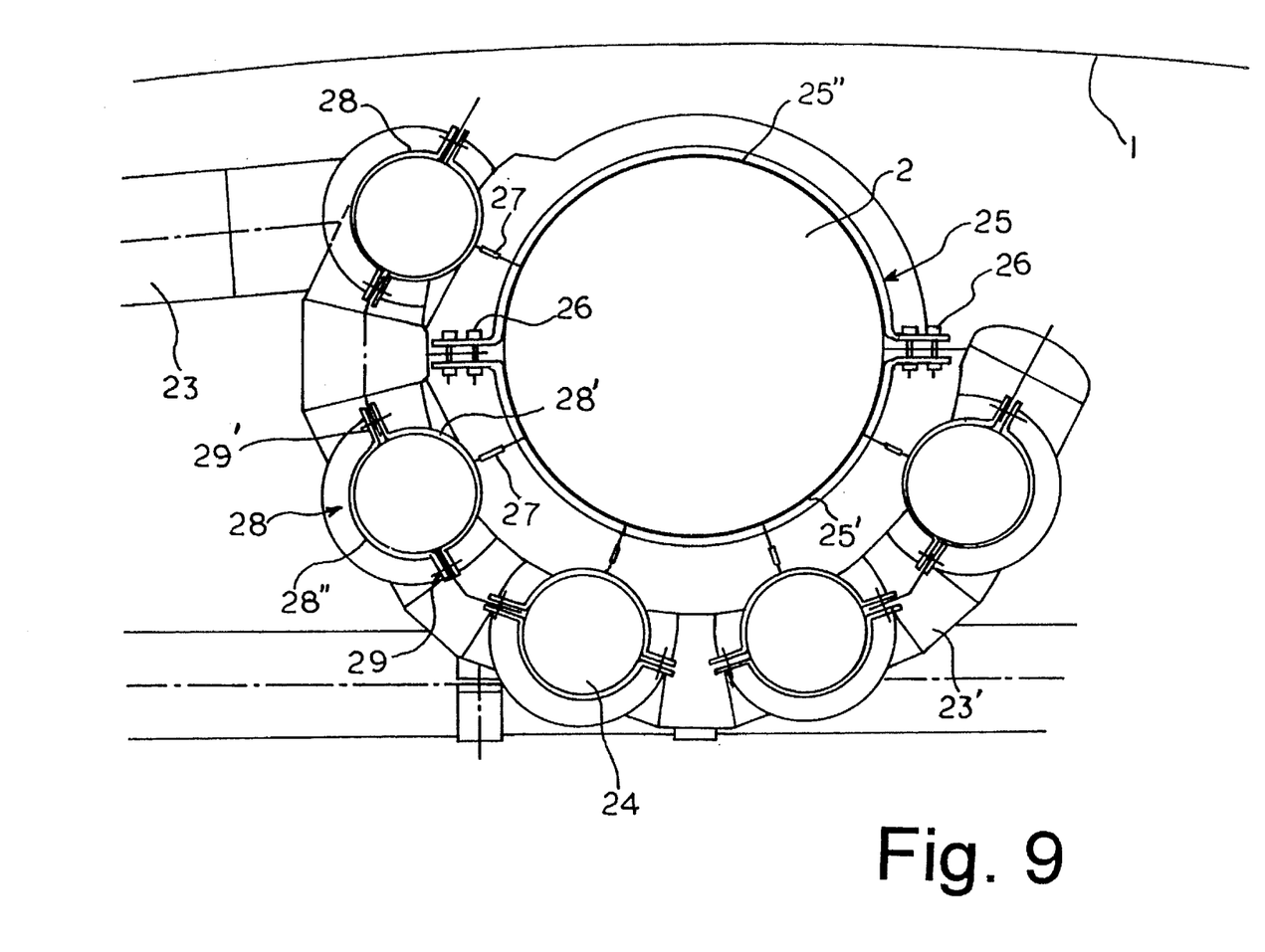
FIG. 9 is a plan view of the strainers shown in FIG. 8.

Reference is now made to FIGS. 8 and 9 which, in combination with FIGS. 1 and 2, illustrate how a number of secondary strainers 24 are connected, by a third conduit 23, to the first conduit 4 connected to the suction pump. In the embodiment illustrated, five secondary strainers 24 are connected to each suction pump and the associated back-flushable strainer. Each secondary strainer consists of an elongate, apertured tube which is substantially vertically mounted and which has a diameter or maximum cross-sectional dimension in the range of 200–400 mm, suitably 250–350 mm, and a length which is at least five times, suitably at least ten times, larger than the diameter. In the embodiment shown in FIGS. 8 and 9, the strainer tubes 24 have a diameter of about 300 mm and a length of about 4 m. However, the length of the strainer tubes may vary within fairly wide limits, e.g. in the range of 2–6 m. As in the strainer 3, the holes in each strainer tube may have a diameter in the range of 2–4 mm, in which case the total hole area should be in the range of 25%–40%. The strainer tubes may either be continuous throughout their entire length or be composed of shorter tubular sections.

In a preferred embodiment, the secondary strainers 24 are mounted on one of the columns 2 forming part of the loadbearing structure of the containment. In this way, the mounting of the strainers 24 does not involve any engagement whatsoever with the lining of the wall 1 and thus does not cause any sealing problems with respect to the lining. As appears most clearly from FIG. 8, the strainers are mounted with the aid of a number of clamp sets which are vertically spaced apart along the upright or column 2 and which each comprise a main clamp 25 consisting of two first part-circular hoop elements 25', 25" enclosing the column 2 and interconnected by bolted joints 26, 26' or the like. The hoop element 25' is provided with four radially projecting support means 27 which at a free end each support one of two second part-circular hoop elements 28', 28" which jointly enclose each strainer 24 and are interconnected by bolted joints 29, 29'. In analogous manner, the hoop element 25" is provided with a radially projecting support means 27 and an associated additional clamp set 28 which supports one of the strainers 24 (five in all). Thus, the clamp means 25, 28 enable simple and expedient mounting of the individual elongate strainers, each easily introduced down into the containment also through extremely narrow passages. At the lower ends, the strainers 24 are each connected to an arcuate tubular portion 23' by flanged joints. The tubular portion 23' constitutes one end of the conduit 23, whose opposite end is connected to the first conduit 4 passing from the back-flushable strainer 3. To be more precise, the two conduits 4 and 23 are interconnected at a point 30 (see FIG. 2) located between the back-flushable strainer 3 and the suction pump disposed on the outside of the containment.

Function and Advantages of the Invention

This invention is based on the insight that the pressure drop across the strainers is a function of the coverage degree as well as the surface load (flow). Tests have shown that the pressure drop is roughly proportional to the thickness of the fibre mat or cake and to the speed squared. Thus, a doubled strainer area permits a fibre mat four times as thick for a given pressure drop, which means that eight times the amount of fibres can be retrieved (unless the thickness becomes so considerable as to prevent collection).

In the inventive device described above, the back-flushable strainer 3 has about the same area as conventional strainers, whereas the additional, secondary strainers 24 have a total area which is about 10–20 times larger. As a result, the inventive device is capable of handling about 500–1000 times larger amounts of fibres at a given pressure drop, while at the same time involving a considerable improvement of the cleaning effect of the strainers. The provision of the secondary strainers 24 by the side of each back-flushable strainer 3 ensures that also large amounts of fibres can be intercepted without there being any need of back-flushing soon after a reactor trip.

The advantages of the invention are obvious. Owing to their elongate and slender shape, the strainers 24 can be introduced through extremely narrow passages, while at the same time being easily mounted inside the containment without any need of complicated equipment or without the leak-proof lining on the inside of the containment being in any way affected. The combination of the elongate, slender shape and the vertical arrangement of the strainers further ensures that these are not acted upon by excessive mechanical forces when the water in the condensation pool is heaving. Moreover, the back-flushable strainer designed in accordance with FIGS. 3–7, ensures a considerably improved effect in back-flushing, since the wings 17 facilitate the release of the fibres from the outside of the strainer wall as well as the rotation-generating means 18 improving the flushing effect.

Conceivable Modifications of the Invention

It goes without saying that the invention is not restricted to the embodiment described above and shown in the drawings. Thus, the collecting conduit 23 from the additional strainers 24 may be connected directly to the back-flushable strainer 3 (whether a conventional strainer or the preferred inventive strainer illustrated in FIGS. 3–7), the conduit 4 to the suction pump being connected to an opposite end of the back-flushable strainer (the latter being thus open at both ends). Furthermore, the strainer 24 can be modified in various ways. For instance, a folded fine strainer, e.g. consisting of straining cloth, may be provided in each perforated strainer. If so, the external, cylindrical and perforated strainer wall serves as a prestrainer for the internal straining cloth or fine strainer, which is then protected by the external perforated strainer wall or tube, which of course is much stronger. Also the back-flushable strainer shown in FIGS. 3–7 can be modified in various ways. For instance, means other than radially projecting wings or metal sheets can be used for dividing the external fibre mat into several separate sections. Thus, the strainer wall need not be perforated in axial separate zones of suitable width.

We claim:

1. A device for filtering water to at least one emergency cooling system in a nuclear power plant of the type comprising a reactor arranged in a containment which substantially consists of an upright, suitably cylindrical container whose bottom part forms a pool for collecting water formed by condensation of steam present in the containment, the condensation pool including a number of back-flushable strainers (3) serving to filter water which is taken from the pool and, if required, is supplied to nozzles in the emergency cooling system in order to cool the reactor core in the event of an inadmissible temperature rise therein, each strainer having the shape of a housing with at least one, suitably cylindrical, apertured strainer wall (10) through which the water can flow from the outside and into the housing, and being connected, by a first conduit (4) passing through the container wall (1), to a suction pump disposed outside the container wall, as well as connected to a second conduit (7) for supplying wash water to the interior of the housing in order, if required, to flush the strainer wall (10) by flowing the wash water through it from the inside and out, thereby removing filtrate deposited on the outside of the strainer wall, characterised in that a number of secondary strainers (24), each consisting of an elongate, apertured tube which is substantially vertically mounted and has a diameter or maximum cross-sectional dimension from about 200 mm to about 400 mm and a length dimension at least five times greater than the diameter dimension, are connected either directly or indirectly by a third conduit (23) to the first conduit (4) connected to the suction pump.

2. A device as set forth in claim 1, characterised in that the secondary strainer tubes (24) are mounted on a vertical upright, preferably in the form of a column (2) arranged in the containment and forming part of the load-bearing structure thereof.

3. A device as set forth in claim 2, characterised in that the structure is achieved by means of a number of clamp sets which are vertically spaced apart along the upright (2) and which each comprise a main clamp (25) consisting of two first part-circular hoop elements (25', 25") which enclose the upright (2) and are interconnected by bolted joints (26, 26'), and that at least one of the two first hoop elements (25', 25") has a number of radially projecting support means (27) which at a free end support one of two second particular hoop elements (28', 28") which together enclose an individual strainer tube (24) and are interconnected by bolted joints (29, 29') or the like.

4. A device as set forth in claim 1, characterised in that the strainer wall (10) of the back-flushable strainer (3) includes means (17) for dividing a fibre mat or layer built up on the outside of the strainer wall into several part sections.

5. A device as set forth in claim 4, characterised in that the means (17) consist of a number of longitudinal, peripherally spaced-apart and radially projecting wings or wing-like elements (17).

6. A device as set forth in claim 4, characterised in that the second conduit consists of a tube (7) which, in the area of an opening located concentrically in relation to the strainer wall (10), includes rotation-generating means (18) comprising a set of curved blades (20) extending between the tube and a substantially conical body located centrally therein, whereby water passing through the annular gap between the tube and said body is caused to rotate or circle so as to be pressed out against the strainer wall (10).

7. A device as set forth in claim 1, characterised in that the housing of the back-flushable strainer (3) includes an upper end and a lower end, said strainer being closed at said upper end the first conduit (4) being connected to the lower end, and the wash-water conduit (7) being concentrically inserted in a portion (4') of the first conduit (4).

8. A device as set forth in claim 1, characterised in that the third conduit (23) is connected to the first conduit (4) at a point (30) between the back-flushable strainer (3) and the suction pump.

9. A device as set forth in claim 2, characterized in that the strainer wall (10) of the back-flushable strainer (3) has means (17) for dividing a fibre mat or layer built up on the outside of the strainer wall into several part sections which separately are more easily released than a continuous circumferential fibre mat.

10. A device as set forth in claim 3, characterised in that the strainer wall (10) of the back-flushable strainer (3) has means (17) for dividing a fibre mat or layer built up on the outside of the strainer wall into several part sections which separately are more easily released than a continuous circumferential fibre mat.

11. A device as set forth in claim 5, characterized in that the second conduit consists of a tube (7) which, in the area of an opening located concentrically in relation to the strainer wall (10), is provided with a rotation-generating means (18) in the form of a set of curved blades (20) extending between the two and a substantially conical body located centrally therein, so that water passing through the annular gap between the tube and said body is cause to rotate or circle so as to be pressed out against the strainer wall (10).

12. A device as set forth in claim 1 wherein said maximum cross-sectional dimension of said secondary strainer is between about 250 mm and 350 mm.

13. A device as set forth in claim 1, characterized in that said length dimension is at least ten times greater than the diameter dimension.

14. A device for filtering water to at least one emergency cooling system in a nuclear power plant of the type comprising a reactor arranged in a containment which substantially consists of an upright, suitably cylindrical container whose bottom part forms a pool for collecting water formed by condensation of steam present in the containment, the condensation pool including a number of back-flushable containers (3) searing to filter water which is taken from the pool and, if required, is supplied to nozzles in the emergency cooling system in order to cool the reactor core in the event of an inadmissible temperature rise therein, each strainer having a shape of a housing with at least one, suitably cylindrical, apertured strainer wall (10) through which the water can flow from the outside and into the housing, and being connected, by a first conduit (4) passing through the container wall (1), to a suction pump disposed outside the container wall, as well as connected to a second conduit (7) for supplying wash water to the interior of the housing in order, if required, to flush the strainer wall (10) by flowing the wash water through it from the inside and out, thereby removing filtrate deposited on the outside of the strainer wall, characterized in that a number of secondary strainers (24), each consisting of an elongate, apertured tube having a diameter or maximum cross-sectional dimension from about 200 mm to about 400 mm and a length dimension at least five times greater than the diameter dimension, are connected either directly or indirectly by a third conduit (23) to the first conduit (4) connected to the suction pump.

* * * * *